Oct. 20, 1970  O. A. HALLSTROM, JR  3,534,875
RECIPROCATING CONVEYOR

Filed Nov. 18, 1968  3 Sheets-Sheet 1

OLOF A. HALLSTROM, JR
INVENTOR

BY *Oliver Q. Olson*

AGENT

Oct. 20, 1970   O. A. HALLSTROM, JR   3,534,875
RECIPROCATING CONVEYOR
Filed Nov. 18, 1968                                3 Sheets-Sheet 2
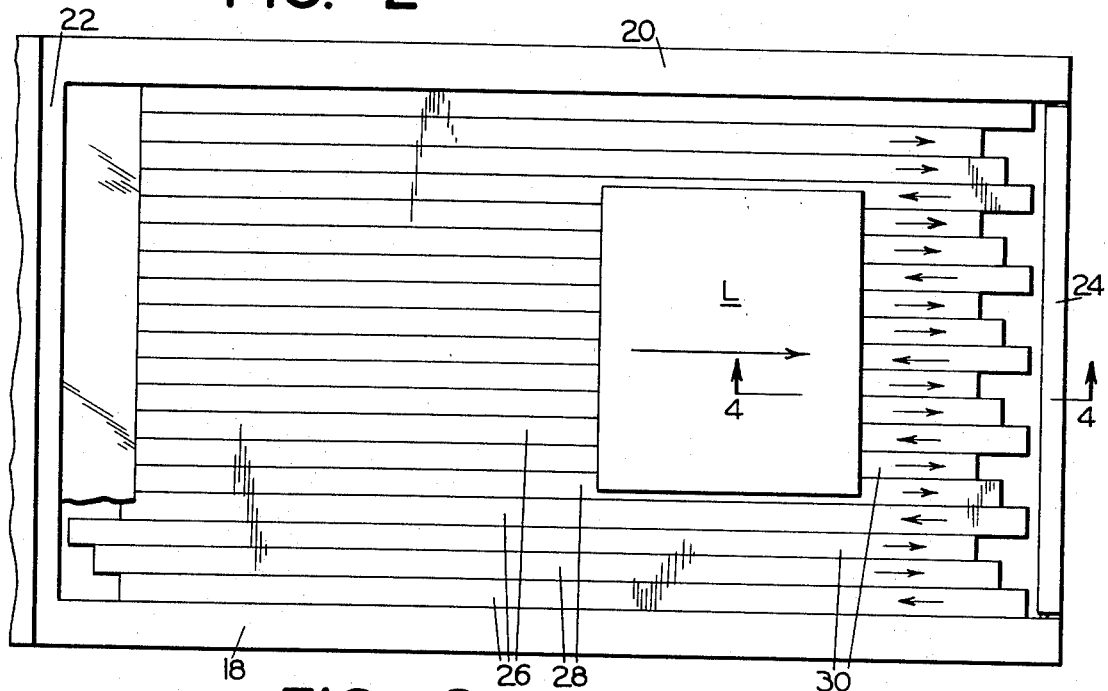
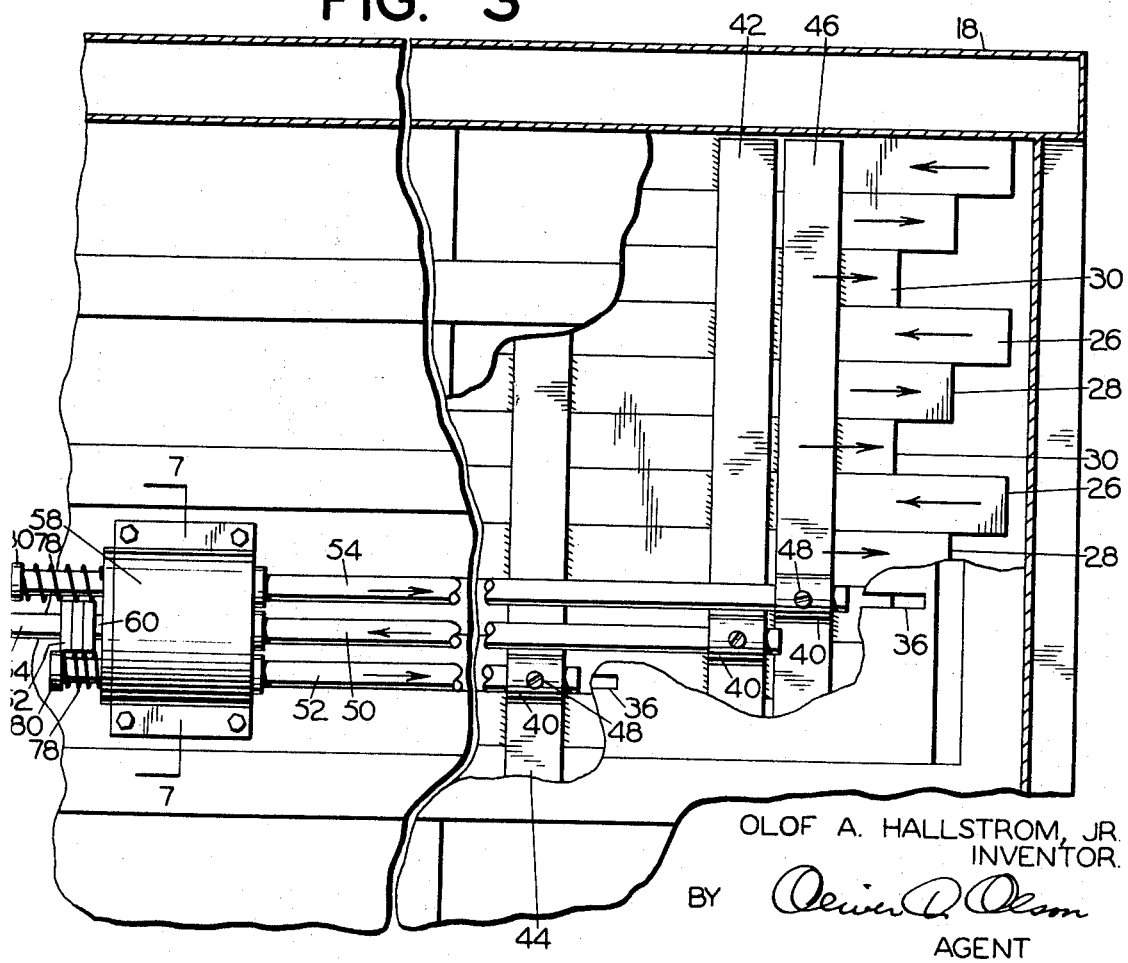
OLOF A. HALLSTROM, JR.
INVENTOR.
BY
AGENT

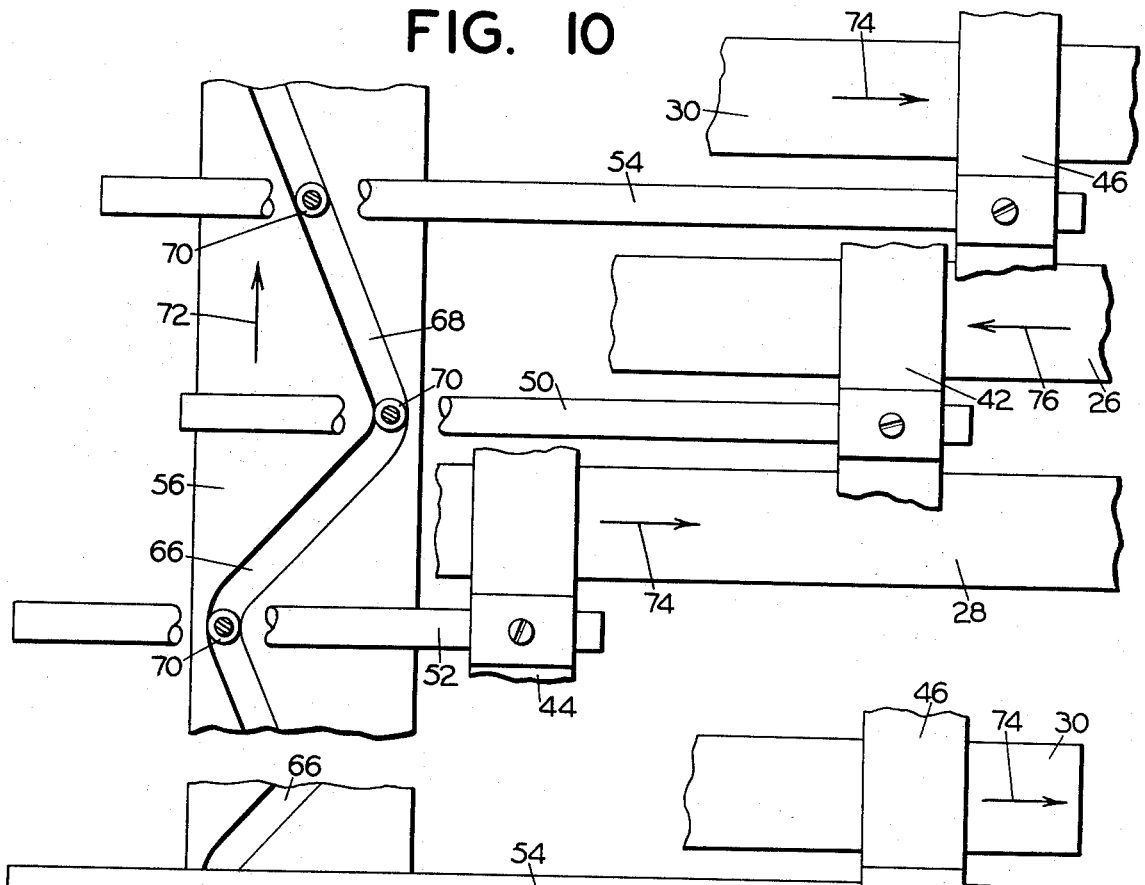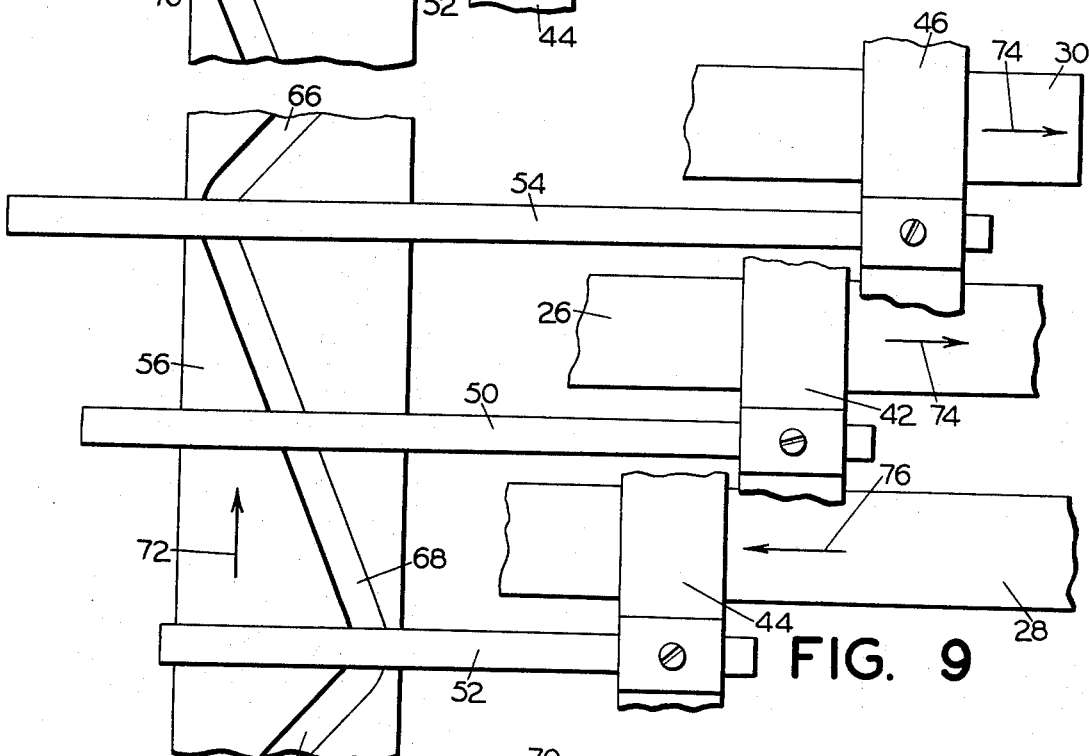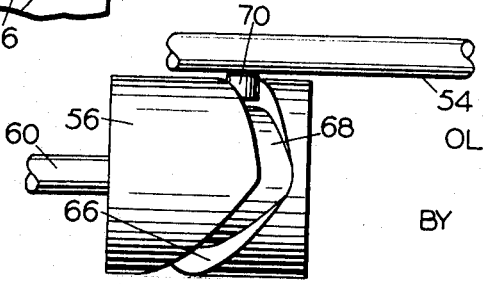

United States Patent Office 3,534,875
Patented Oct. 20, 1970

3,534,875
RECIPROCATING CONVEYOR
Olof A. Hallstrom, Jr., Rte. 3, Box 37–D,
Tillamook, Oreg. 97141
Filed Nov. 18, 1968, Ser. No. 776,384
Int. Cl. B60p *1/00*
U.S. Cl. 214—83.3                               7 Claims

ABSTRACT OF THE DISCLOSURE

A plurality of groups of at least three elongated slats are arranged side by side to form a conveyor type truck bed. The slats of each group are connected to a drive mechanism in such manner that there are always a greater number of slats of each group moving simultaneously in the conveying direction while the remaining slat or slats of the group move in the opposite direction.

BACKGROUND OF THE INVENTION

This invention relates to reciprocating conveyors, and more particularly to a reciprocating conveyor which operates efficiently to provide continuous movement of material deposited thereon.

Reciprocating slat type conveyors provided heretofore generally utilize groups of two slats with the slats of each group moving vertically and horizontally relative to each other, or with the slats of each group moving simultaneously in one direction and alternately in the opposite direction. These arrangements provide a step-wise movement of material. In many instances a step-wise advance of the material is followed by a partial retraction of the material. In any case, such arrangements are wasteful of conveyor drive power and are slow and inefficient in operation.

SUMMARY OF THE INVENTION

It its basic concept the reciprocating conveyor of the present invention provides simultaneous movement of a greater number of conveyor slats in the conveying direction while the remaining fewer number of slats are retracting in the opposite direction.

It is by virtue of the foregoing basic concept that the principal objective of the present invention is achieved, namely to overcome the disadvantages of prior reciprocating slat type conveyors, as enumerated hereinbefore.

Another important object of this invention is the provision of a reciprocating conveyor of the class described which may be utilized in industrial applications as well as providing a truck bed capable of operation to load material onto the truck and to unload material from the truck.

A further important object of the present invention is to provide a reciprocating conveyor of the class described which is simplified construction for economical manufacture and is capable of long service life with minimum maintenance and repair.

The foregoing and other objects and advantages of the present invention will appear from the following detailed description taken in connection with the accompanying drawings of the preferred embodiment.

BRIEF DESCRIPTION OF THE DRAWINGS

FIG. 2 is a fragmentary plan view, as viewed in the direction of the arrows 2—2 in FIG. 1, the smaller arrows indicating the direction of movement of the conveyor slats at a predetermined instant, and the larger arrow indicating the direction of movement of a load on the conveyor.

FIG. 3 is a fragmentary foreshortened sectional view taken on the line 3—3 in FIG. 1.

FIG. 8 is a fragmentary side elevation of the drive cam illustrated in FIGS. 6 and 7.

FIG. 9 is a fragmentary schematic representation of the operation of the drive cam in one position of its rotation.

FIG. 10 is a fragmentary schematic representation, similar to FIG. 9, of the operation of the drive cam in another of its positions of rotation.

DESCRIPTION OF THE PREFERRED EMBODIMENT

Figure 1:
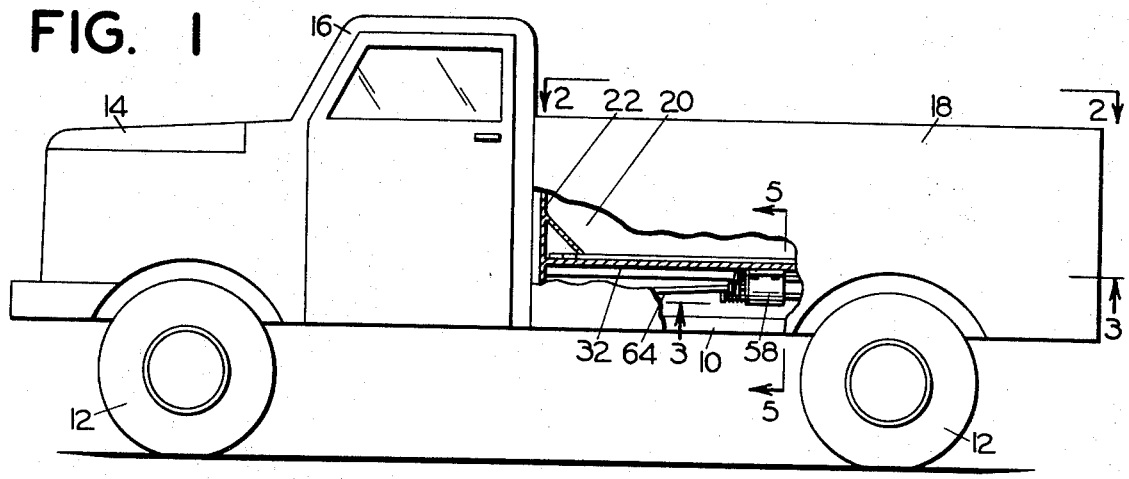
FIG. 1 is a side elevation, partially broken away, of a truck having incorporated therewith a reciprocating conveyor truck bed embodying the features of the present invention.

Although the reciprocating conveyor of the present invention may be utilized per se in a variety of industrial applications, it has particular utility in forming the load supporting bed of a truck. Thus, there is shown in FIG. 1, for purposes merely of illustration, a truck frame 10 mounted on wheels 12 and supporting a drive engine compartment 14, an operator's compartment 16 and a load carrying compartment defined by the side walls 18 and 20, front wall 22 and pivoted tail gate 24. Between these components defining the load carrying compartment is mounted the conveyor type truck bed of the present invention.

The conveyor type truck bed comprises a plurality of groups of elongated slats extending longitudinally of the truck in the direction of conveying movement and arranged side by side transversely of the vehicle. In the embodiment illustrated (FIG. 2) each group consists of three slats 26, 28 and 30, although it is explained hereinafter that each group may include more than three slats.

Figure 6:
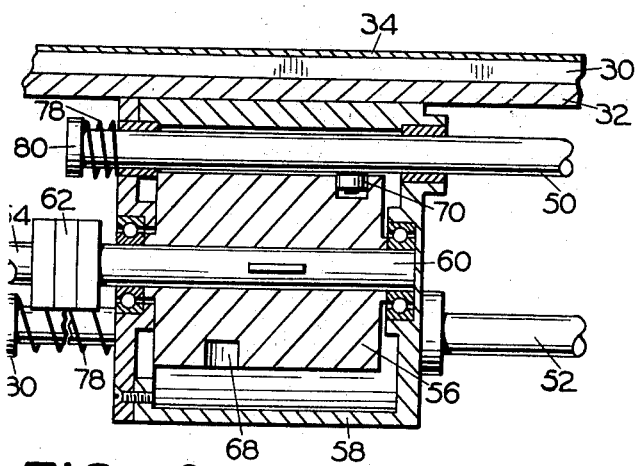
FIG. 6 is a fragmentary sectional view taken on the line 6—6 in FIG. 5.

The slats are supported slidably upon a sub-frame 32 for longitudinal reciprocation. In the preferred embodiment illustrated (FIG. 6) the slats are spaced apart laterally and the spaces between slats are covered by overlying strips 34 of metal, one secured to each of the slats. Each strip 34 freely overlies a portion of the adjacent slat, permitting relative longitudinal reciprocation of the slats. The overlying portion of each strip preferably is sufficiently resilient to flex upward and allow debris to work its way through the space between the slats. The strips are omitted from FIGS. 1, 2, 3, 9 and 10 for clarity of explanation.

Figure 4:
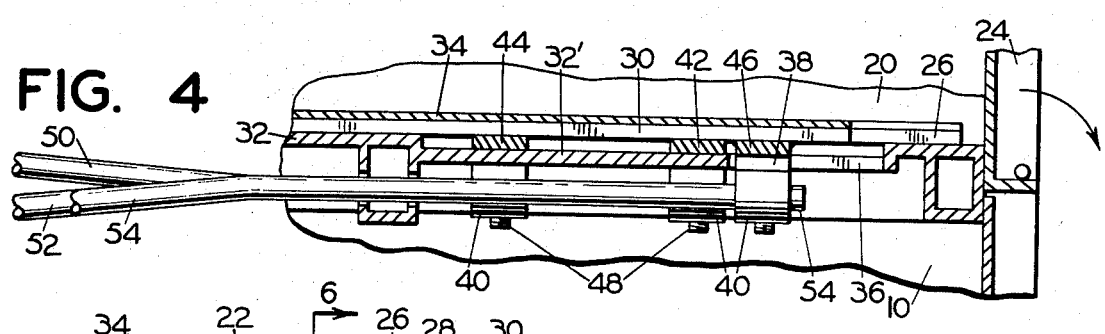
FIG. 4 is a fragmentary sectional view taken on the line 4—4 in FIG. 2.
Figure 5:
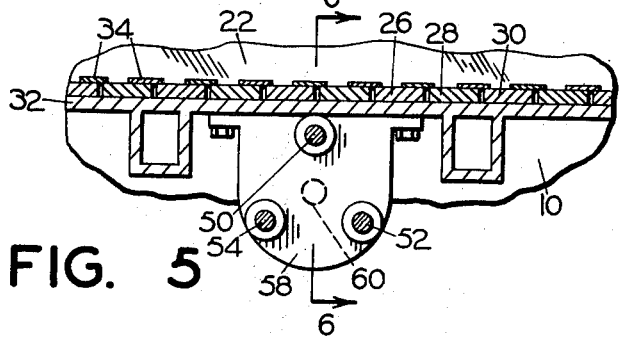
FIG. 5 is a fragmentary sectional view taken on the line 5—5 in FIG. 1.
Figure 7:
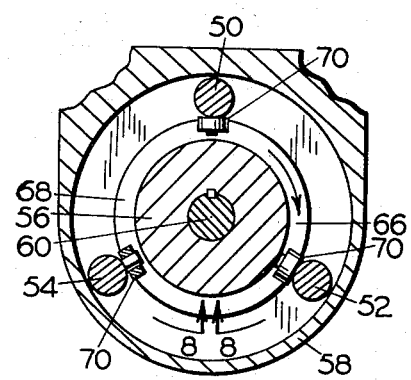
FIG. 7 is a fragmentary sectional view taken on the line 7—7 in FIG. 3.

Intermediate its ends the sub-frame is provided with a downwardly offset section 32' (FIG. 4). This section is provided with a plurality of laterally and longitudinally spaced slots 36 each of which receives slidably therethrough the flange 38 of a connecting collar 40. The flanges are welded or otherwise secured to the undersides of transverse bars 42, 44 and 46 which are supported for sliding movement on the upper surface of the offset section of the sub-frame. There are three such bars in the embodiment illustrated, and to each bar is secured a different one of the slats of each group making up the conveyor bed. Thus, for example, the slats 26, 28 and 30 are secured to the bars 42, 44 and 46, respectively, for simultaneous movement therewith.

Each of the collars 40 is provided with a central bore which removably receives therethrough one end of an elongated drive rod which is secured releasably thereto by such means as the set screw 48. Thus, the rods 50, 52 and 54 are operatively connected to the bars 42, 44 and 46, respectively.

The opposite ends of the rods are connected to means for driving them in a reciprocative manner. Although the drive means may comprise hydraulic cylinder units, rack and pinion assemblies, or other suitable means, the drive cam assembly illustrated is preferred.

The drive cam assembly includes a cylindrical cam member 56 mounted for axial rotation within a housing 58 secured to the sub-frame 32 of the truck bed. A shaft 60 projecting from the cam member is connected through a coupling, such a universal joint 62, to a drive shaft 64 connected to a power take-off of the vehicle engine. It will be understood that this shaft may, alternatively, be connected to a separate power source, such as a rotary hydraulic motor, electric motor, or internal combustion engine.

The cylindrical cam member is provided with a groove which extends eccentrically about the circumference of the cylinder in the longitudinal direction of the latter. Thus, for example, one portion 66 of the groove extends in one direction (right to left in FIG. 8) for 120° of the cylinder circumference and the other portion 68 of the groove extends in the opposite direction for the remaining 240°. This relationship is illustrated graphically in FIGS. 9 and 10 wherein the surface of the cylinder is depicted as being laid out in a flat plane.

Extending across the outer surface of the cylinder are the three drive rods 50, 52 and 54. These rods are disposed 120° apart and extend through openings in the housing 58 which confine them against axial rotation about the cylinder but permit their longitudinal movement relative to the cylinder and housing. A guide follower roller 70 secured to each rod is confined within the eccentric guide groove in the cylinder, whereby rotation of the latter effects longitudinal reciprocation of the rods.

Referring to FIGS. 9 and 10 of the drawings it is to be observed that the rollers 70 associated with any two of the three drive rods always will be operating in the longer segment 68 of the groove while the third rollers associated with the third rod will be operating in the shorter segment 66 of the groove.

Accordingly, the slats operatively connected to the two drive rods whose rollers are engaged in the longer groove segment 68 will move simultaneously in the conveying direction while the remaining slat of the group will move in the opposite direction. Moreover, the latter slat moves at a greater speed in the retracting direction because of the steeper slope of the shorter groove segment 66.

In FIG. 9, with the rotation of the drive cam 56 indicated by the arrow 72, the slats 26 and 30 will be moved in the conveying direction of the arrows 74, while the remaining slat 28 will be moved in the opposite, retracting direction indicated by the arrow 76. In FIG. 10 the cylinder has rotated 120° from its position in FIG. 9, and the slats 28 and 30 will be moved in the conveying direction indicated by the arows 74, while the remaining slat 26 will be moved in the retracting direction indicated by the arrow 76. Accordingly, it can be seen that at all times any two of the slats will be driven in the conveying direction simultaneously while the remaining slat is being driven in the retracting direction. The greater speed of movement in the retracting direction is necessary in order for the retracting slat to reach its limit of retraction and then reverse to the conveying direction before one of the other two slats reverses from the conveying direction to the retracting direction.

From the foregoing it will be apparent that if the smaller groove segment 66 is made less than 120° and the longer groove segment 68 is made correspondingly greater than 240°, there will be a portion of each cycle of operation in which all three slats will move in the conveying direction.

It will be further apparent from the foregoing that if each group of slats includes more than three slats, the relative lengths of the groove sections 66 and 68 must be modified correspondingly. For example, if each group consists of four slats, then the shorter groove section 66 must be no greater than 90° and the associated longer groove section 68 no shorter than 270°. If the group consists of five slats, the shorter groove section 66 must be no greater than 72° and the associated longer groove section 68 no less than 288°.

Means may be provided for assisting the retraction of each drive rod, to minimize the stress on the cam member 56 and guide follower rollers 70. In the embodiment illustrated, such means is provided by the coil springs 78 (FIGS. 3 and 6) which encircle the projecting ends of the drive rods. One end of each spring abuts against the housing 58 and the opposite end of the spring abuts an enlarged head 80 on the rod. The springs thus assist movement of the rollers 70 through the shorter, more oblique portion 66 of the guide groove during rotation of the cam member.

In the operation of the reciprocating conveyor described hereinbefore, let it be assumed that the drive cam 56 is rotated in the direction in which two of the three slats of each group move simultaneously in the conveying direction toward the tail gate 24 of the vehicle (toward the right in FIG. 2) to effect unloading of the load L. Since two slats of each group of three always move simultaneously in said conveying direction, the load is caused to move continuously in the unloading direction. If it is desired to load an object onto the truck and move it inward toward the front wall 22, the drive direction of the power take-off or other power source is reversed, to reverse the direction of the rotation of the drive cam 56, as will be apparent. In either direction the movement of the load being conveyed is continuous, as distinguished from the stepwise movement achieved with reciprocating type conveyors of the prior art.

Conveyor speed may be adjusted by the rotational speed of the drive cam, or of any other type of drive mechanism employed to reciprocate the drive rods. If desired, the connection of the drive rods to the transverse connecting bars may be made through pivoted levers, or other means by which to achieve mechanical advantage in order to minimize the drive power requirement.

It will be apparent to those skilled in the art that various other changes in the size, shape, number, type and arrangement of parts described hereinbefore may be made without departing from the spirit of this invention.

Having now described my invention and the manner in which it may be used, I claim:

1. A reciprocating conveyor, comprising
    (a) a frame,
    (b) at least one group of at least three elongated slat members mounted adjacent each other on the frame for independent longitudinal reciprocation, and
    (c) drive means on the frame engaging each slat member and operable to move more than half of the number of slat members of each group simultaneously in a conveying direction and to move the remainder of the slats of each group in the opposite direction at a higher rate of speed.

2. The reciprocating conveyor of claim 1 wherein the frame comprises a vehicle frame and the slat members form a load supporting bed on the vehicle.

3. The reciprocating conveyor of claim 1 wherein the slats are spaced apart laterally, and an elongated cover strip is secured to each slat and freely overlies a portion of the adjacent slat, spanning the space therebetween.

4. The reciprocating conveyor of claim 1 wherein the drive means comprises
    (a) rotary eccentric drive cam means,
    (b) a plurality of drive rod means one engaging each slat of a group for longitudinal reciprocation therewith, and
    (c) connector means interengaging each drive rod means and the eccentric drive cam means.

5. The reciprocating conveyor of claim 4 including resilient means engaging each drive rod means and urging the latter in one direction of reciprocation.

6. The reciprocating conveyor of claim 4 wherein the drive cam means comprises
   (a) a cylinder having an eccentric guide groove in its circumference, one portion of the groove extending longitudinally of the cylinder in one direction for not more than 120°, and the remaining portion of the groove extending in the opposite direction for not less than 240°, and
   (b) follower means on each drive rod means freely engaging the guide groove.
7. The reciprocating conveyor of claim 6 including resilient means engaging each drive rod means and urging the latter in the direction of movement corresponding to the movement of the follower means through said one portion of the guide groove.

References Cited
UNITED STATES PATENTS 2,973,856  3/1961  Brooks _____ 198—219
3,303,949  2/1967  Nickel et al. _____ 214—83.3

RICHARD E. AEGERTER, Primary Examiner

A. N. GOODMAN, Assistant Examiner

U.S. Cl. X.R.

198—218